United States Patent
Ren et al.

(10) Patent No.: US 12,222,012 B2
(45) Date of Patent: Feb. 11, 2025

(54) MAGNETORHEOLOGICAL FLUID BRAKE AND CONTROL METHOD THEREFOR

(71) Applicant: Feng Ren, Jilin (CN)

(72) Inventors: Feng Ren, Jilin (CN); Zhengying Jiang, Jilin (CN)

(*) Notice: Subject to any disclaimer, the term of this patent is extended or adjusted under 35 U.S.C. 154(b) by 0 days.

(21) Appl. No.: 17/908,874

(22) PCT Filed: Mar. 5, 2020

(86) PCT No.: PCT/CN2020/078056
§ 371 (c)(1),
(2) Date: Sep. 1, 2022

(87) PCT Pub. No.: WO2021/174502
PCT Pub. Date: Sep. 10, 2021

(65) Prior Publication Data
US 2024/0200622 A1 Jun. 20, 2024

(30) Foreign Application Priority Data
Mar. 2, 2020 (CN) .......................... 202010134604.0

(51) Int. Cl.
*F16D 57/00* (2006.01)
*B60T 1/087* (2006.01)
(Continued)

(52) U.S. Cl.
CPC ............ *F16D 57/002* (2013.01); *B60T 1/087* (2013.01); *F16D 65/78* (2013.01); *F16D 2065/784* (2013.01); *F16D 2125/08* (2013.01)

(58) Field of Classification Search
CPC .. F16D 57/002; F16D 65/78; F16D 2065/784; F16D 2125/08; F16D 2121/18; B60T 1/087
(Continued)

(56) References Cited

U.S. PATENT DOCUMENTS 2,791,308 A * 5/1957 Barrett .................... F16D 37/02
192/113.3
3,962,595 A * 6/1976 Eddens ................. F16D 57/002
188/164
(Continued)

FOREIGN PATENT DOCUMENTS

| CN | 103758896 A | 4/2014 |
| CN | 104295639 A | 1/2015 |

(Continued)

OTHER PUBLICATIONS

International search report of PCT/CN2020/078056.

*Primary Examiner* — Thomas J Williams (57) ABSTRACT

A magnetorheological fluid brake and a control method therefor. When braking is not required, the brake does not work, and no field coils are energized. When braking is required and the brake receives a retarding braking signal, a field coil module is energized, the current is gradually increased, an oil port is gradually closed, and a back pressure inside the brake is also gradually increased, thereby gradually increasing a braking force so as to achieve a braking effect. By using the characteristics of a pump and the characteristics of a valve for the magnetorheological fluid, the viscosity of the magnetorheological fluid is adjusted, such that a back pressure is generated in a pump body, which in turn imposes a braking torque on a shaft, thereby performing braking.

9 Claims, 7 Drawing Sheets

(51) Int. Cl.
*F16D 65/78* (2006.01)
*F16D 125/08* (2012.01)

(58) Field of Classification Search
USPC .................................. 188/267, 267.1, 267.2
See application file for complete search history.

(56) References Cited

U.S. PATENT DOCUMENTS

| | | | |
|---|---|---|---|
| 7,891,474 B2 | 2/2011 | McDaniel | |
| 8,157,689 B2 * | 4/2012 | Steinwender | F16D 57/002 |
| | | | 475/311 |
| 10,780,943 B2 * | 9/2020 | Denninger | B62M 19/00 |
| 11,725,709 B2 * | 8/2023 | Battlogg | F16F 9/535 |
| | | | 188/267.2 |
| 2004/0188198 A1 * | 9/2004 | Na | F16D 57/002 |
| | | | 188/267.2 |
| 2004/0238300 A1 * | 12/2004 | Cherney | B62D 5/005 |
| | | | 188/267 |
| 2007/0181391 A1 | 8/2007 | St Clair et al. | |
| 2024/0200622 A1 * | 6/2024 | Ren | F16D 57/002 |

FOREIGN PATENT DOCUMENTS

| | | | |
|---|---|---|---|
| CN | 104806665 A | * | 7/2015 |
| CN | 205173301 U | | 4/2016 |
| CN | 110792704 A | | 2/2020 |
| CN | 210034234 U | | 2/2020 |

* cited by examiner

MAGNETORHEOLOGICAL FLUID BRAKE AND CONTROL METHOD THEREFOR

TECHNICAL FIELD

The present invention relates to a magnetorheological fluid braking system, and in particular to a magnetorheological fluid braking system and a device thereof, which are suitable for various passenger vehicles, engineering vehicles and commercial vehicles.

BACKGROUND

At present, braking systems of traditional vehicles are still dominated by friction-based braking systems. An engine intake manifold generates a degree of vacuum, and a vacuum booster uses the degree of vacuum to assist a driver in operating a brake pedal, a brake master cylinder is used to generate a brake pressure, and a hydraulic control unit and an electronic control unit are used to adjust the pressure of a brake wheel cylinder for each wheel, thereby adjusting the braking force of each wheel. The principle of a hydraulic brake is that when braking, the driver depresses the brake pedal, such that a brake fluid in the brake master cylinder enters the brake wheel cylinder of each wheel brake respectively through a brake pipeline. Pistons in each wheel cylinder separate brake shoes and friction plates, and the friction plates come into contact with the brake drum to generate a friction force, so as to prevent the wheel connected to the brake drum from rotating, thereby generating a braking force. Electro-hydraulic braking (EHB) systems and electro-mechanical braking (EMB) systems are advanced at present. The main problem of the electro-hydraulic braking systems is that the pressure is adjusted under the control of a solenoid valve switch, it is likely to cause large noise, and the use of a large flow and high pressure accumulator improves the complexity of vehicle layout and matching. The electro-mechanical braking system directly generates a braking force from the output power of an electric motor when braking, and the peak power demand is large. At the same time, vibration and high temperature place high demands on the electric motor.

These brakes perform braking through friction. When braking is performed frequently, the friction plates will overheat and are likely to fail, which will lead to poor braking effect and brake failure. In addition, the traditional braking systems have a disadvantage that there are hydraulic fluctuations in the brake pipeline, so the brake control cannot be accurately performed and linear control requirements cannot be met.

Figure 1:
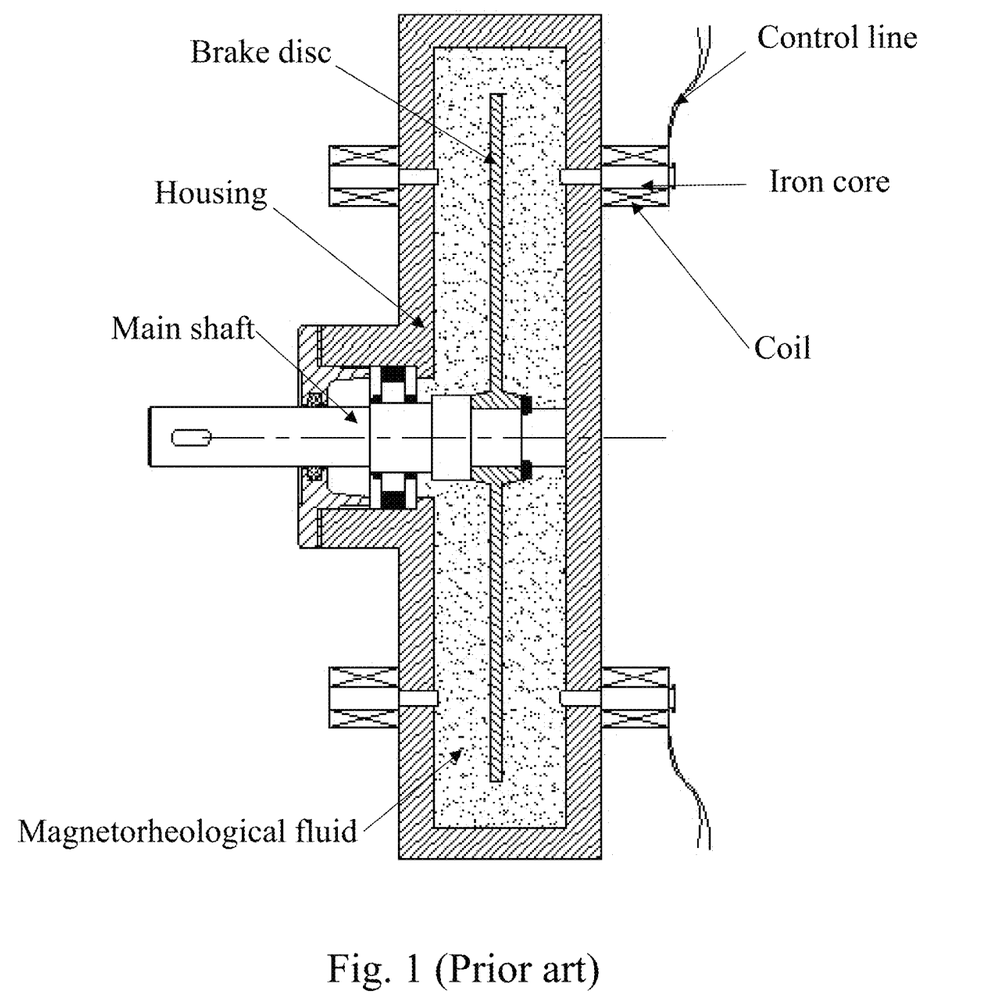
FIG. 1 is a schematic structural diagram of a magnetorheological fluid brake in the prior art.
Figure 2:
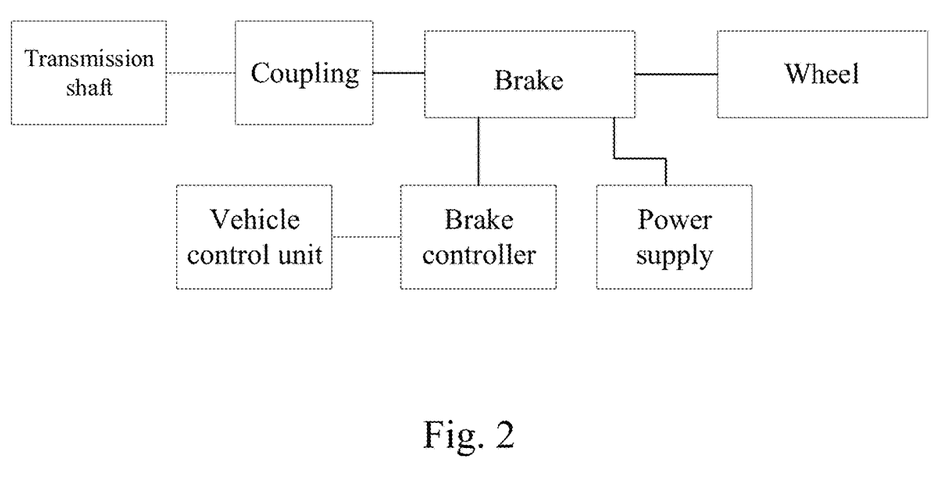
FIG. 2 is a schematic diagram of the control principle of a control system for the magnetorheological fluid brake of the present invention.

As shown in FIG. 1, in which a traditional structure diagram is shown, a traditional magnetorheological brake is still provided with a brake disc, and its principle has not broken away from the friction principle. As shown in FIG. 1 below, its principle is that when a coil is energized, a magnetic field is applied to a magnetorheological fluid, and the magnetorheological fluid becomes solid, which hinders the relative movement between the brake disc and a housing, thereby generating resistance. After the power is cut off, the magnetic field disappears and the braking torque disappears.

In the present invention, the characteristics of a pump and the characteristics of a valve for the magnetorheological fluid are used to adjust the viscosity of the magnetorheological fluid, such that a back pressure is generated in a pump body, and then a braking torque is generated on a shaft.

SUMMARY

To solve the above technical problems, the present invention provides a new magnetorheological fluid brake, which has the characteristics of small structure, low energy consumption, large braking torque, fast response, low cost and mass production.

Figure 3:
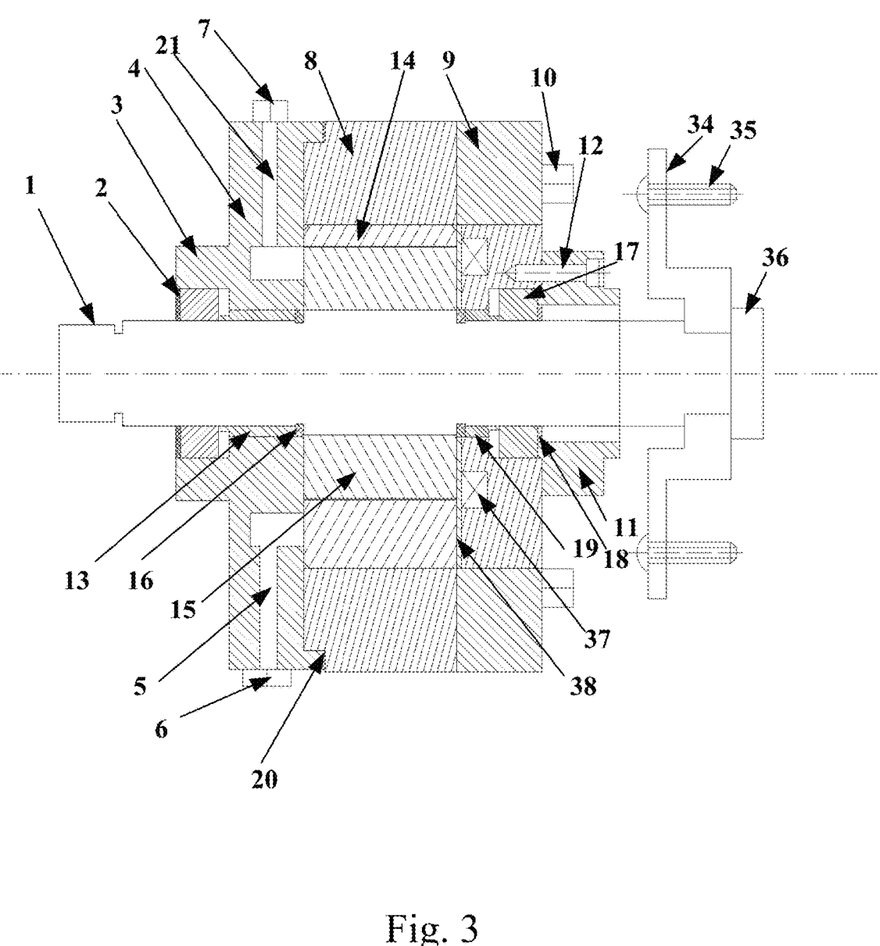
FIG. 3 is a structural schematic diagram of a magnetorheological fluid brake in Embodiment I of the present invention.
Figure 4:
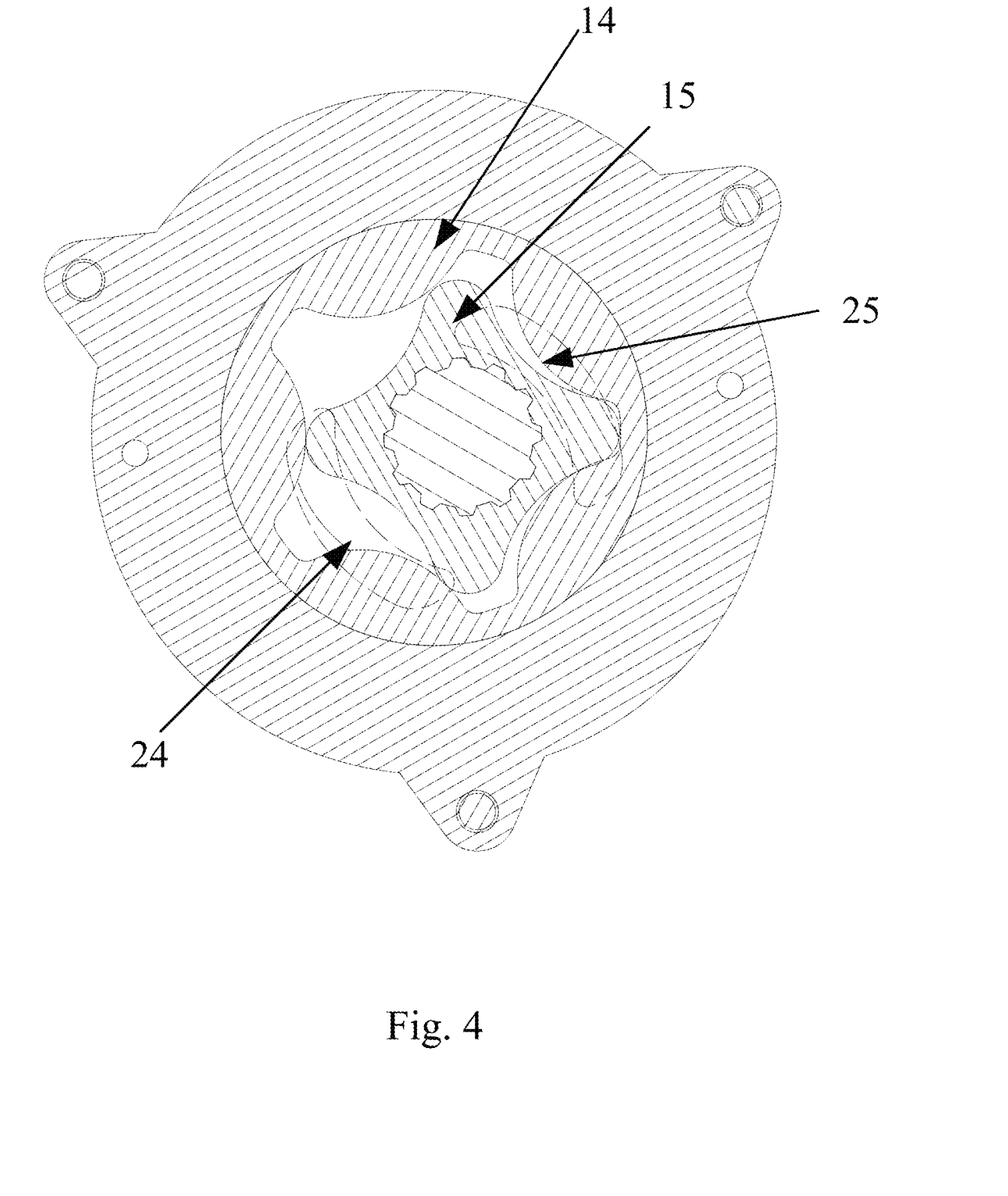
FIG. 4 is a schematic cross-sectional view of a main housing in Embodiment I of the present invention.
Figure 5:
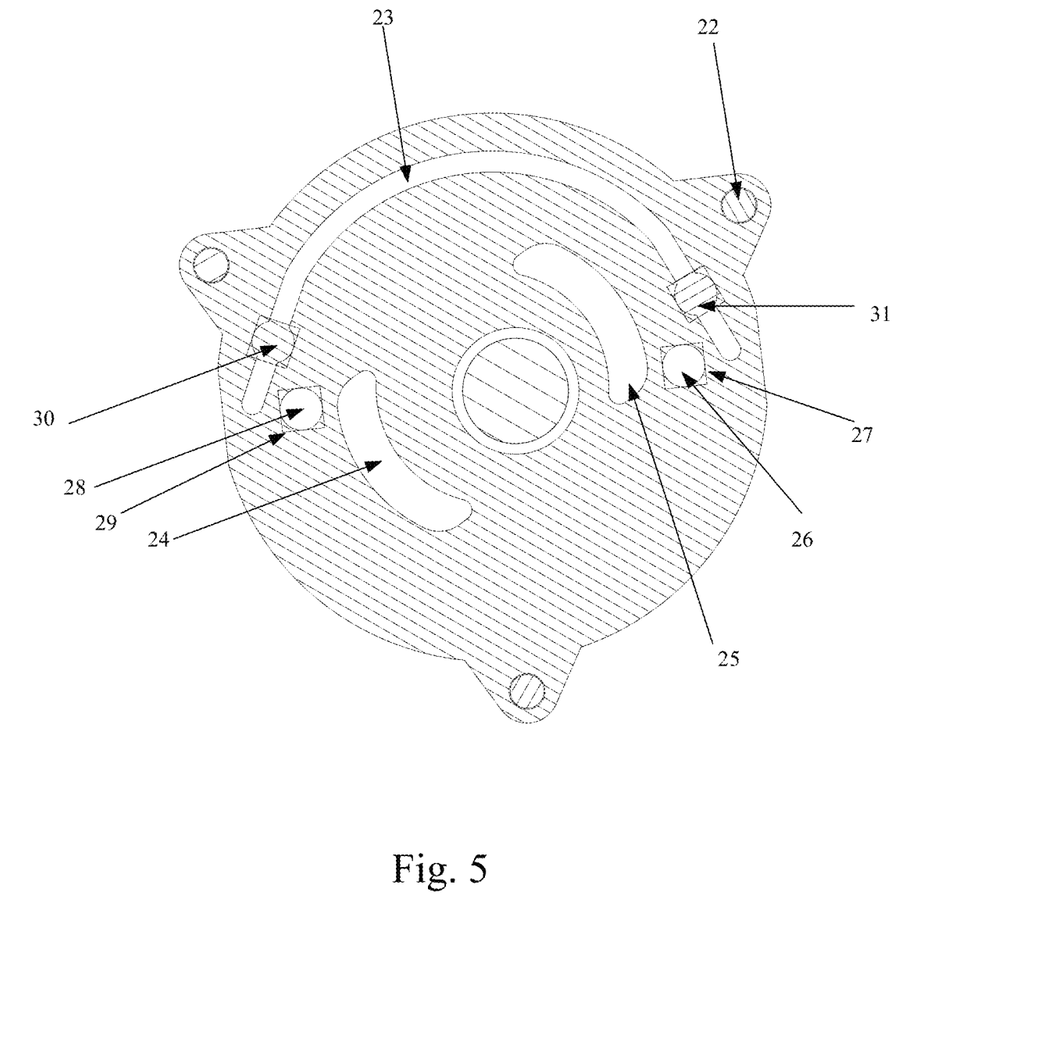
FIG. 5 is a radial cross-sectional diagram of a left housing in Embodiment I of the present invention.

To achieve the above purpose, the present invention uses the following technical scheme:

a magnetorheological fluid brake, including a main housing 8, an inner rotor 15, an outer rotor 14, a left housing 4, a heat exchanger 9, a sealing portion and a distribution passage, the outer rotor 14 and the inner rotor 15 being arranged in sequence in the main housing 8, and a shaft 1 passing through the inner rotor 15; the left housing 4 being arranged on a left side of the main housing 8, and the distribution passage being arranged inside the left housing 4; the heat exchanger 9 being arranged on a right side of the main housing 8, wherein the distribution passage includes a high-pressure oil channel 21 and a low-pressure oil channel 5; an oil filling port (7) is in communication with the high-pressure oil channel (21), and the low-pressure oil channel (5) is in communication with an oil discharge port (6); the high-pressure oil channel (21) is provided with a high-pressure oil port (28), and the low-pressure oil channel (5) is provided with a low-pressure oil port (26); the high-pressure oil port (28) and the low-pressure oil port (26) are in communication with each other through a flow-through channel; a first field coil module (27) is provided in the high-pressure oil port (28), a second field coil module (29) is provided in the low-pressure oil port (28), and a third field coil module (30) and a fourth field coil module (31) are provided in the flow-through channel;

a bearing end cover (11) is connected to the main housing (8) via a screw (12), a connecting disc (34) is connected to the shaft (1) via a splined connection, wheel fixing bolts (35) are mounted to the connecting disc (34), a wheel is connected to the brake via the wheel fixing bolts (35), and a bolt (36) is fixed to the shaft (1) to axially position the connecting disc (34); and a silicon steel plate (38) is fixed on a right side of the inner and outer rotors and connected to the main housing (8) via a countersunk screw.

Optionally, the sealing portion includes a first sealing ring 16 arranged inside the left housing (4), a second sealing ring 20 arranged inside the main housing (8), and an oil seal (2) arranged outside the shaft.

Optionally, the brake further includes a first bushing 13 and a second bushing 19 arranged outside the shaft.

Optionally, the brake further includes a coolant inlet (32) and a coolant outlet (33).

Optionally, the field coil module includes a field coil for providing an excitation to a magnetorheological fluid; and further includes an internal flow channel for the magnetic fluid to pass through.

Optionally, the internal flow channel is a single-hole flow channel or a multi-hole flow channel.

Figure 7:
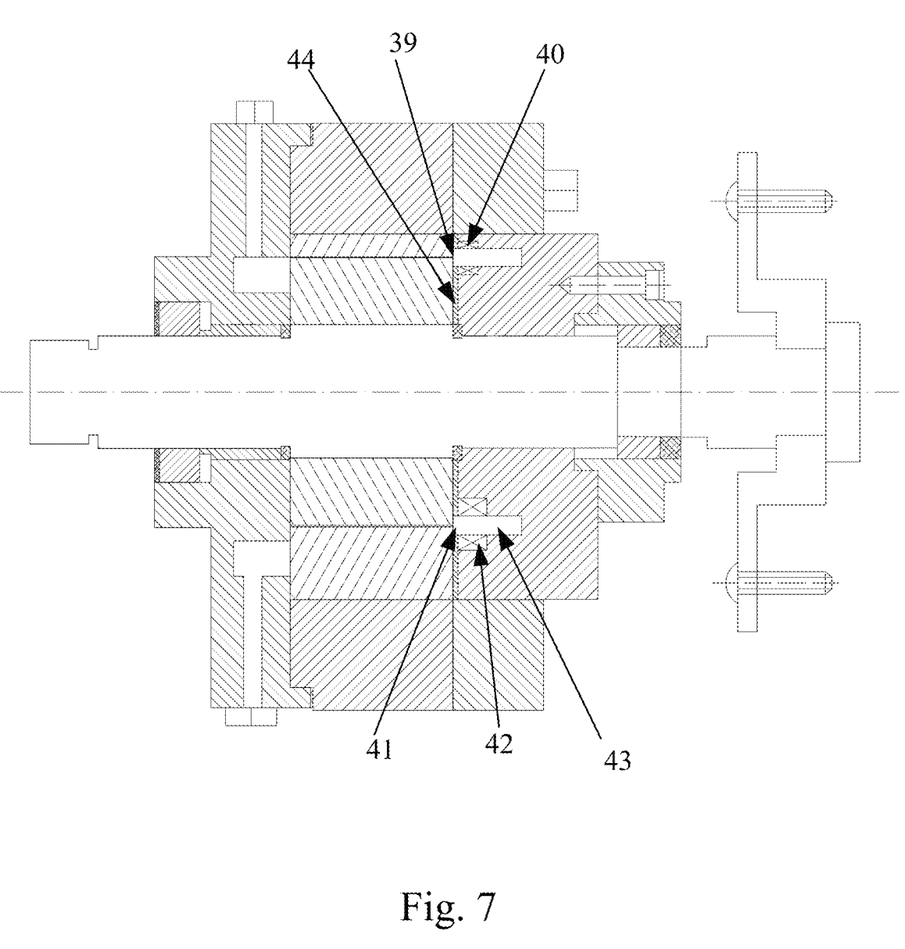
FIG. 7 is a structural diagram of Embodiment IV of the present invention.

Optionally, a steel plate (44) is sealed on the right side of the inner rotor 15 and the outer rotor 14, and the steel plate (44) is provided with a first via hole (39) and a second via hole (41); and the first and second via holes and an oil channel provided in the main housing form a channel for enabling a high-pressure area to communicate with a low-pressure area, and a fifth field coil module (40) and a sixth field coil module (42) are arranged on the channel.

Figure 6:
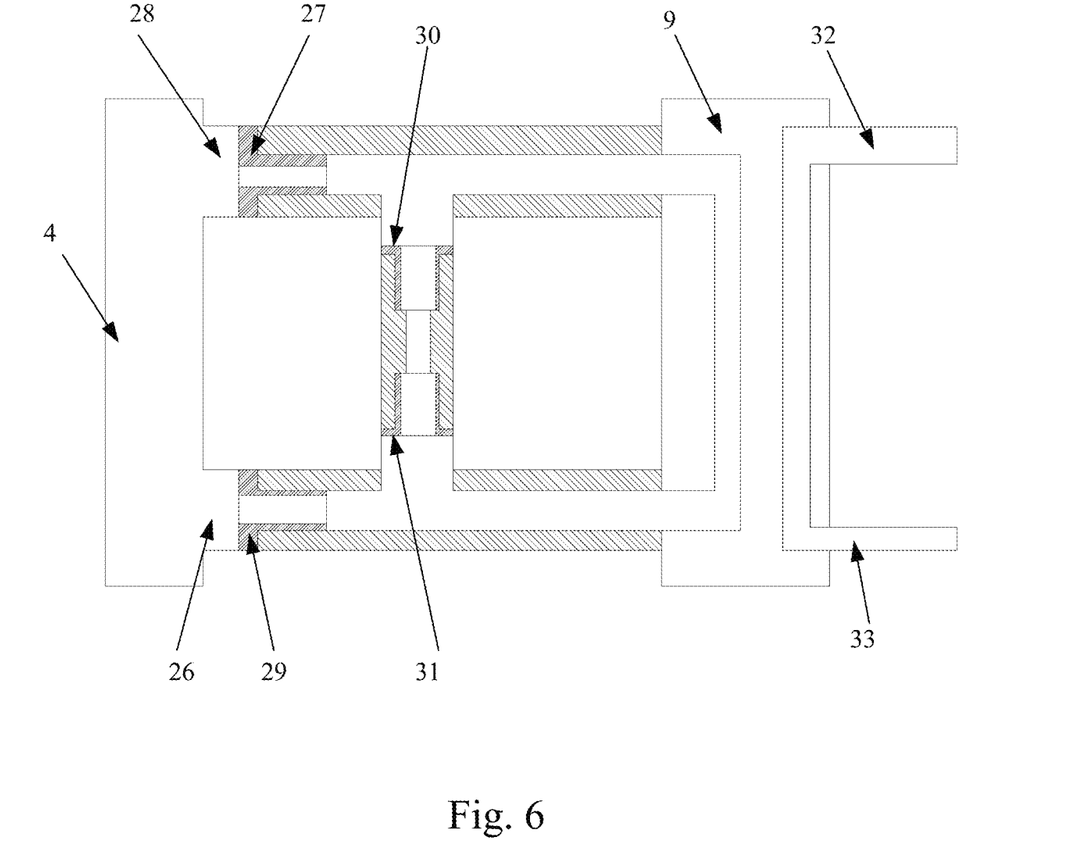
FIG. 6 is a schematic diagram of a magnetorheological fluid channel and control of the system in Embodiment I of the present invention.

The present invention provides a method for controlling the magnetorheological fluid brake, wherein when braking is not required, the brake does not work, no field coils are energized, the shaft (1) of the brake drives the inner rotor (15) to rotate, the inner rotor (15) meshes with the outer rotor (14) to makes a free rotational motion, and the brake generates no braking force; when braking is required and the brake receives a braking signal, the third field coil module (30) is energized, the viscosity of the magnetorheological fluid is gradually increased, the damping is gradually increased, and the flow-through channel is blocked to separate the high-pressure area from the low-pressure area; and the first field coil module (27) is energized, the current is gradually increased, and the high-pressure oil port (28) is gradually closed, so that the back pressure inside the brake is gradually increased, thereby gradually increasing a braking force so as to achieve a braking effect; and when a vehicle travels in a reverse direction, the fourth field coil module (31) is energized, the viscosity of the magnetorheological fluid is gradually increased, the damping is gradually increased, and the flow-through channel is blocked to separate the high-pressure area from the low-pressure area; and the second field coil module (29) is energized, the current is gradually increased, and the low-pressure oil port (26) is gradually closed, so that the back pressure inside the brake is gradually increased, thereby gradually increasing a braking force so as to achieve a braking effect.

The present invention uses the characteristics of a valve for the magnetorheological fluid and applies the valve to generate a high back pressure so as to perform braking. The braking principle is not based on friction, the braking torque is large and the response is fast (in the order of milliseconds), and the safety of the braking system is significantly improved. Compared with EHB, the present invention is completely different in principle and structure, its control by using the change of coil current is better than the switch valve control of EHB, the defect of inaccurate flow control of a mechanical valve is avoided, a high-pressure accumulator is replaced, and the complexity and cost of the system are reduced. EMB directly uses the electric motor to push a pressure block for braking, which consumes a lot of energy and generates a lot of heat. The energy consumption of the present scheme is relatively low, and the heat dissipation is easier than EMB.

Advantages of this brake system are as follows.
1. The change of braking torque is continuous, that is, the continuous change of braking torque can be controlled according to the continuous change of current.
2. The magnetorheological effect is used to perform control, and the energy consumption of control is relatively low.
3. The response time of magnetorheology from Newtonian fluid to viscoelastic solid is sensitive, which is in the order of millimeters.
4. The braking system can realize accurate anti-lock braking. The traditional ABS systems have disadvantages such as pressure fluctuation and response lag, while the patented braking system can continuously and quickly perform control, and match the change of ground load by means of a sensor to realize accurate, fast and high-quality braking without pressure pulsation. The braking system can realize the braking process of ABS, and thus can replace the current ABS systems, reducing the cost.
5. This braking system can be applied to battery electric vehicles.
6. The system may be mounted for each wheel, so that the braking system involves redundant braking, and the failure of an individual brake will not lead to the disappearance of braking force of the whole vehicle.
7. By adding an energy recovery system, when the power supply of the vehicle fails, the braking of the vehicle can be realized through the recovered braking energy.

LIST OF REFERENCE NUMERALS

Main housing 8, Outer rotor 14, Inner rotor 15, Left housing 4, Shaft 1, Oil seal 2, Bearing 3, Low-pressure oil channel 5, High-pressure oil channel 21, Oil discharge port 6, Oil filling port 7, Heat exchanger 9, Screw for the heat exchanger 10, Bearing end cover 11, Screw for the bearing end cover 12, Bearing 17, Oil seal 18, First bushing 13, First sealing ring 16, Second bushing for the shaft 19, Second sealing ring 20, Connecting bolt 22, High and low pressure oil port channel 23, Low-pressure distribution oil channel 24, High-pressure distribution oil channel 25, Low-pressure oil port 26, First field coil module 27, High-pressure oil port 28, Second field coil module 29, Third field coil module 30, Fourth field coil module 31, Coolant inlet 32, Coolant outlet 33, Wheel fixing bolt 35, Fixing screw 36, Field coil 37, Silicon steel sheet (or other material of high magnetic permeability) 38, Connecting disc 34, Wheel fixing bolt 35, Bolt 36, Steel plate 44, First via hole 39, Second via hole 41, Fifth field coil module 40, and Sixth field coil module 42.

DETAILED DESCRIPTION

The technical schemes in the embodiments of the present invention are clearly and completely described in the following with reference to the drawings in the embodiments of the present invention. It is obvious that the described embodiments are only some of the embodiments of the present invention and are not all the embodiments.

In the description of the present invention, it should be understood that, descriptions relating to orientation, for example, orientation or positional relationships indicated by terms such as "up", "down", "front", "back", "left", "right", "top", "bottom", "inside", and "outside", are based on the orientation or positional relationships shown in the accompanying drawings, and are to facilitate the description of the present invention and simplify the description only, rather than indicating or implying that the device or element referred to must have a specific orientation or be constructed and operated in a specific orientation, and therefore cannot be construed as limiting the present invention.

Embodiment I

A Shaft 1 is supported by a bearing 3 and a bearing 17. The left side of the bearing is sealed by an oil seal 2, and the right side thereof is positioned by a bushing 13. A heat exchanger 9 is connected to a main housing 8 via a screw 10. The left side of the bearing 17 is positioned by a bushing 19 and a bearing end cover 11, and is sealed by an oil seal 18. The bearing end cover 11 is connected to the main housing 8 via a screw 12. A connecting disc 34 is connected to the shaft 1 via a splined connection or is fixedly connected thereto according to the specific vehicle model. The connecting disc is provided with wheel fixing bolts 35, and a wheel is connected to a brake via the fixing bolts 35. A bolt 36 is fixed to the shaft 1 to axially position the connecting disc 34. A silicon steel plate 38 is fixed on a right side of inner and outer rotors and connected to the main housing 8 via a countersunk screw.

When a brake controller receives a retarding braking instruction from a vehicle control unit, the brake controller sends out an instruction to control the brake to perform braking.

When the brake does not work, a high-pressure port and a low-pressure port of the brake are connected through high-pressure and low-pressure oil channels, all field coils are not energized, a brake input shaft drives the inner rotor to rotate, and the inner rotor meshes with the outer rotor to make free rotational motion, so the brake generates no braking force.

When the brake receives a braking signal, a third field coil module 30 is energized, and a magnetorheological fluid gradually changes from liquid to solid, so as to completely block high- and low-pressure oil channels and separates high- and low-pressure areas. A first field coil module 27 is energized and controlled by the brake controller, and the current is gradually increased, and a high-pressure oil port 28 is gradually closed, so that a back pressure inside the brake is increased, thereby gradually increasing a braking force until the high-pressure oil port is completely closed, and the braking force reaches the maximum.

When the vehicle travels in a reverse direction, a fourth field coil module 31 is energized to completely block the high- and low-pressure oil channels and separate the high- and low-pressure areas. A second field coil module 29 is energized and controlled by the brake controller, the current is gradually increased, the magnetorheological fluid gradually changes from liquid to viscoelastic solid, and the low-pressure oil port 26 is gradually closed, so that the back pressure inside the brake is increased, thereby gradually increasing the braking force until the low-pressure oil port 26 is completely closed, and the braking force reaches the maximum.

When working, the magnetorheological fluid circulates through the heat exchanger 9, and a vehicle coolant circulates through an inlet 32 of the heat exchanger 9 and then through an outlet 33, to dissipate heat generated by the brake.

A heat dissipation fan blade is mounted on the left side of the connecting disc 34. When the vehicle is traveling, the connecting disc rotates with the wheel, and can also dissipate the heat from the brake.

Heat dissipation can be carried out by using a heat dissipation system of the vehicle itself, or an independent heat dissipation system may be provided. By adding a heat dissipation device, a heat dissipation fan, a circulating water pump or a heat dissipation electric motor, or providing a heat dissipation water circulation channel on a housing of the brake, the specific arrangement is flexibly based on heat balance.

The inner rotor 15 of the brake is internally meshed with the outer rotor 14, and the inner rotor is mounted to the shaft 1 via anti-torsion splines to ensure that sufficient torque can be transmitted. When braking, the shaft drives the inner rotor to rotate, and the inner rotor drives the outer rotor to rotate within the main housing 8. The left housing 4 is connected to the main housing 8, is positioned by a positioning socket and a cylindrical pin, and is coupled to the main housing via a bolt, to ensure the accurate eccentricity between the main housing 8 and the inner and outer rotors. The left housing 4 is provided with a flow distribution oil channel to form a flow distribution mechanism, so that the inner rotor, the outer rotor and the left housing form a low-pressure cavity and a high-pressure cavity. The low-pressure cavity is in communication with the low-pressure oil port through the oil channel, and the high-pressure cavity is in communication with the high-pressure oil port. The high-pressure oil port is in communication with an oil filling port 7, and the low-pressure oil port is in communication with an oil discharge port 6. At the same time, the high-pressure oil port and the low-pressure oil port are in communication with each other through an oil channel.

Embodiment II

On the basis of the structure of the above embodiment, the brake can not only adopt an internal meshing rotor, but also an external meshing rotor, a one-axis screw pump rotor, a two-axis screw rotor magnetorheological fluid brake, a three-axis screw rotor magnetorheological fluid brake, etc.

Embodiment III

On the basis of the above embodiment, the channel inside the field coil module is of a single-hole or multi-hole structure, the outer side of the field coil is subjected to magnetic isolation treatment to prevent interference with the outside, and the inner side of the coil is made of a material of a high magnetic permeability to make full use of the magnetic field.

Embodiment IV

A steel plate 44 is sealed on the right side of a stator and a rotor, and the steel plate 44 is provided with a first via hole 39 and a second via hole 41. The first and second via holes and an oil channel provided in the main housing form a channel for communicating a high-pressure area with a low-pressure area, and a fifth field coil module (40) and a sixth field coil module 42 are arranged on the channel. By adjusting the viscosity of the magnetorheological fluid in a fifth field coil module 40 and a sixth field coil module 42, the communication and separation of the high- and low-pressure areas is adjusted, and then the back pressure inside the brake is adjusted, thereby adjusting the magnitude of the braking force. At this time, a cross-section field coil module may be provided on the left side of the stator and the rotor to adjust the viscosity of magnetorheological fluid in the brake cavity and therefore the magnitude of the braking force.

What is claimed is:
1. A magnetorheological fluid brake, comprising
a main housing (8), an inner rotor (15), an outer rotor (14), a side housing (4), a heat exchanger, a sealing portion and a distribution passage, the outer rotor (14) and the inner rotor (15) being arranged in sequence in the main housing (8), and a shaft (1) passing through the inner rotor (15); the side housing (4) being arranged on one side of the main housing (8), and the distribution passage being arranged inside the side housing (4); the heat exchanger (9) being arranged on an other side of the main housing (8), wherein the distribution passage comprises a high-pressure oil channel (21) and a low-pressure oil channel (5); an oil filling port (7) is in communication with the high-pressure oil channel (21), and the low-pressure oil channel (5) is in communication with an oil discharge port (6); the high-pressure oil channel (21) is provided with a high-pressure oil port (28), and the low-pressure oil channel (5) is provided with a low-pressure oil port (26); the high-pressure oil port (28) and the low-pressure oil port (26) are in communication with each other through a flow-through channel; a first field coil module (27) is provided in the high-pressure oil port (28), a second field coil module (29) is provided in the low-pressure oil port (26), and a third field coil module (30) and a fourth field coil module (31) are provided in the flow-through channel;

a bearing end cover (11) is connected to the main housing (8) via a screw (12), a connecting disc (34) is connected to the shaft (1) via a splined connection, wheel fixing bolts (35) are mounted to the connecting disc (34), a wheel is connected to the brake via the wheel fixing bolts (35), and a bolt (36) is fixed to the shaft (1) to axially position the connecting disc (34); and a silicon steel plate (38) is fixed on a side of the inner rotor and the outer rotor and connected to the main housing (8) via a countersunk screw.

2. The magnetorheological fluid brake of claim 1, wherein the sealing portion comprises a first sealing ring (16) arranged inside the side housing (4), a second sealing ring (20) arranged inside the main housing (8), and an oil seal (2) arranged outside the shaft.

3. The magnetorheological fluid brake of claim 1, further comprising a first bushing (13) and a second bushing (19) arranged outside the shaft.

4. The magnetorheological fluid brake of claim 1, further comprising a coolant inlet (32) and a coolant outlet (33).

5. The magnetorheological fluid brake of claim 1, wherein the field coil module comprises a field coil for providing an excitation to a magnetorheological fluid, and further comprises an internal flow channel for the magnetic fluid to pass through.

6. The magnetorheological fluid brake of claim 5, wherein the internal flow channel is a single-hole flow channel or a multi-hole flow channel.

7. The magnetorheological fluid brake of claim 1, wherein a steel plate (44) is sealed on the side of the inner rotor (15) and the outer rotor (14), and the steel plate (44) is provided with a first via hole (39) and a second via hole (41); and the first and second via holes and an oil channel provided in the main housing form a channel for enabling a high-pressure area to communicate with a low-pressure area, and a fifth field coil module (40) and a sixth field coil module (42) are arranged on the channel.

8. A magnetorheological fluid retarding control system, having the magnetorheological fluid brake of claim 1, wherein the control system further has a brake controller for controlling braking.

9. A method for controlling the magnetorheological fluid brake of claim 1, wherein when braking is not required, the brake does not work, no field coils are energized, the shaft (1) of the brake drives the inner rotor (15) to rotate, the inner rotor (15) meshes with the outer rotor (14) to makes a free rotational motion, and the brake does not generate a retarding braking force;

when braking is required and the brake receives a braking signal, the third field coil module (30) is energized, the viscosity of the magnetorheological fluid is gradually increased, the damping is gradually increased, and the flow-through channel is blocked to separate a high-pressure area from a low-pressure area; and the first field coil module (27) is energized, the current is gradually increased, and the high-pressure oil port (28) is gradually closed, so that a back pressure inside the brake is gradually increased, thereby gradually increasing a braking force so as to achieve a braking effect; and when a vehicle travels in a reverse direction, the fourth field coil module (31) is energized, the viscosity of the magnetorheological fluid is gradually increased, the damping is gradually increased, and the flow-through channel is blocked to separate the high-pressure area from the low-pressure area; and the second field coil module (29) is energized, the current is gradually increased, and the low-pressure oil port (26) is gradually closed, so that the back pressure inside the brake is gradually increased, thereby gradually increasing a braking force so as to achieve a braking effect.

\* \* \* \* \*